Figure 1:
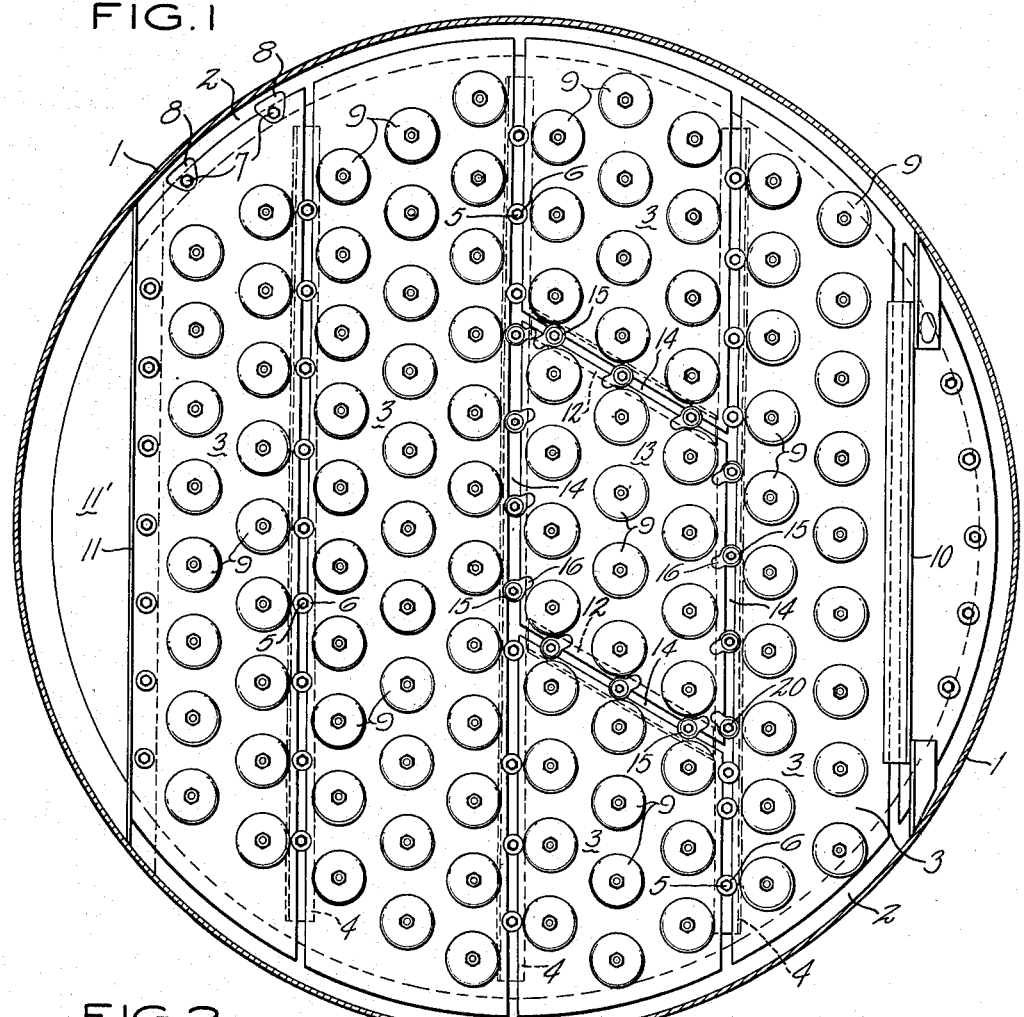

June 22, 1954    E. D. RAPISARDA ET AL    2,681,820

MANWAY COVER CLAMP

Filed Feb. 16, 1952

INVENTORS
EDWARD D. RAPISARDA
WILLIAM E. LEETY

BY *Chapin & Neal*

ATTORNEYS

Patented June 22, 1954

2,681,820

UNITED STATES PATENT OFFICE 2,681,820

MANWAY COVER CLAMP

Edward D. Rapisarda, Agawam, and William E. Leety, Longmeadow, Mass., assignors to Gilbert & Barker Manufacturing Company, West Springfield, Mass., a corporation of Massachusetts Application February 16, 1952, Serial No. 271,954

2 Claims. (Cl. 292—256)

1

This invention relates to improved fastening means for covers.

The invention, while capable of general application, finds one advantageous use as a means for holding in place the covers, which are provided for the manways formed in the trays of a bubble tower.

In a bubble tower, a series of trays are provided at different levels and it is usual to provide each of the trays with an opening or manway to enable a workman to pass from one tray to another. Normally, these manways are closed by covers, each cover being supported on a ledge, which surrounds the manway opening in the tray, and being held to such ledge by clamps, which are releasable from above or below the cover.

The invention has for one object the provision of an improved stud, having an intermediate part to engage in a hole in a cover-supporting ledge, and upper and lower threaded portions to receive clamping nuts, one of which is adapted to engage the top of the cover and the other the underside of the ledge, such stud having a key to fit in a keyway in the ledge and prevent the stud from turning, when the upper nut is turned, and a projection to seat on the upper face of the ledge and prevent the stud from passing through the hole in the ledge, when the upper nut is removed.

The invention has for a further object the provision of a stud of the construction described, having a part depending from its lower threaded portion and provided with means, whereby a workman, located beneath the cover, can hold the stud against rotation while the lower nut is turned.

The invention has for another object the provision of a stud of the kind described, in which the part depending from the lower threaded portion of the stud is fashioned as a pilot with a pointed end to facilitate entrance of the stud into a hole in the cover-supporting ledge and pilot it into proper position.

The invention has for another object the provision of a cover fastening means, including a plurality of washers, each fixed to the cover and projecting beyond the margin thereof so as to partially overlap a floor plate of the tray, when the cover is supported on the ledge, and studs of the kind described, one for each washer and having its upper threaded portion passing through the same, together with nuts on each stud, one to clamp the washer against the floor plate and the cover against the ledge and the other to clamp the stud to the ledge.

2

Figure 2:
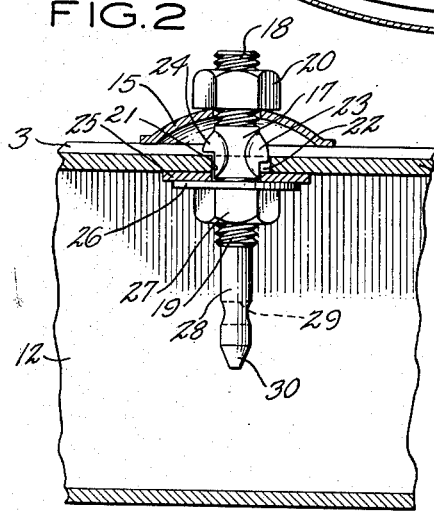
Figure 3:
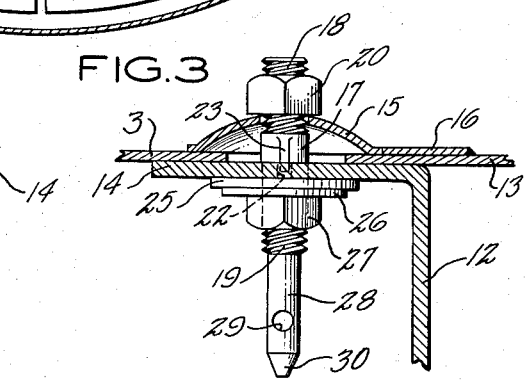

These and other objects will more particularly appear from the following description of one illustrative embodiment of the invention in the accompanying drawings, in which:

Fig. 1 is a small scale sectional plan view of a bubble tower showing one of the trays with its manway, a cover therefor and the clamps for the cover; and Figs. 2 and 3 are full size sectional views respectively taken longitudinally and crosswise of the manway-cover-supporting ledge and showing one of the manway cover clamps.

Referring to these drawings; there is shown in Fig. 1 one of the trays of a bubble tower. The shell of the tower as shown at 1 and 2 is the tower ring, suitably fixed to the shell and serving to support the floor of the tray. This floor is made up of a plurality of plates 3 of thin metal, such as stainless steel, for example, having parallel sides and curved ends and respectively supported along these sides and ends by supports 4 and tower ring 2. The supports 4, as shown, are channels, each of which is secured at its ends to ring 2 in any suitable way (not shown). The plates 3 are fastened to their supports 4 by bolts 5 and washers 6, the bolts each being located between the side edges of two adjacent plates and extending through the support 4 and each of the washers overlapping portions of two plates 3. The ends of each tray plate are similarly clamped to the tower ring 2 by bolts 7 and washers 8, a few of which have been shown in the upper left hand portion of Fig. 1. Each plate 3 carries a plurality of bubble caps 9 of any suitable form. The inlet and outlet weirs are indicated at 10 and 11, respectively, and 11' is the downcomer area leading to the underlying tray.

A manway is formed between the central support 4 and the next adjacent support 4 to the right and between two angle irons 12, each of which extends between and is suitably fixed at its ends to these two supports 4. There are two short plates 3, each extending from the tower ring 2 to an angle iron 12. The manway is marginally embordered by a ledge, which is adapted to support a manway cover 13 flush with the adjacent plates 3. In this particular example, the supporting ledge consists of the upper horizontal leg of each of the two above-named channel supports 4 and the upper horizontal leg of each of the angle irons 12. This ledge is indicated by reference numeral 14. In towers of smaller diameter, where floor supports, such as 4, are not needed, the ledge can be fastened to the under side of the floor plates which emborder the manway. The cover plate 13 may, and usually does, as shown, carry a plurality of bubble caps, such as 9.

The construction, thus far described, is old and well known and its particular details are not important to the present invention, which relates to fastening means for the manway cover. The tray construction otherwise may be of any suitable form, as desired, the one form shown being given merely as an illustrative example of one form that has been found suitable.

The manway cover 13 is provided with a plurality of washers 15, suitably spaced along each margin of the cover. Each washer projects beyond a margin of the cover far enough so that the hole in the washer overlies the central part of the cover-supporting ledge 14 that is exposed between such margin of the cover and the adjacent edge of a plate 3 and so that part of the washer will overlap such plate. Each washer 15 may be fastened to cover 13 by means of an integral tab 16, which is welded to cover 13, or in any other suitable way.

For each washer 15, a stud is provided on the cover-supporting ledge 14, this stud and its mounting being best shown in Figs. 2 and 3. Each stud has an unthreaded and generally cylindrical intermediate portion 17 and upper and lower screw-threaded portions 18 and 19, respectively, which extend axially and in opposite directions one from each end of the portion 17. The upper portion 18 extends through the hole in a washer 15 and receives a nut 20, whereby the washer may be forced against a plate 3 and the latter and the cover 13 forced against the ledge 14. There is provided in this ledge a plurality of holes 21, suitably spaced to receive, one in each, the intermediate portions 17 of the studs. Each hole 21 has a keyway 22, projecting therefrom to receive a key 23, suitably formed in the portion 17. The latter also has a radial projection 24, the lower horizontal edge of which affords a shoulder adapted to engage the top of ledge 14. Beneath the ledge 14, there are provided on the lower threaded portion 19 of each stud an asbestos washer 25, a metallic washer 26 and a nut 27. Initially, the nut 27 is turned up by hand to press the washers 26 and 25 together and the latter against the lower face of ledge 14 and draw the shoulder on projection 24 against the upper face of the ledge. This will hold the studs in position, upstanding from ledge 14, while cover 13 is put in place. When nut 20 is applied, the shoulder on projection 24 may be lifted slightly away from ledge 14, as shown. The engagement of key 23 in keyway 22 prevents the stud from turning while nut 20 is turned and tightened up. The cover may be removed from above by unscrewing the nuts 20 and lifting the cover from its supporting ledge.

It is also desirable to be able to remove the cover from below the tray. This may be done by unscrewing nut 27 and removing it together with the washers 26 and 25, whereupon the cover 13 may be raised from its supporting ledge 14 and removed, carrying with it all the studs which are loosely connected, one to each washer 15, and depend therefrom. In replacing the cover, entry of these dangling studs into their respective holes is facilitated by a pilot-forming, axially-downward and cylindrical extension 28 from the lower threaded part 19 of each stud. Each pilot preferably has a more or less pointed end 30 (of frusto-conical shape as herein shown) which readily enters a hole 21 in ledge 14 and guides the part 28 into the same and the latter, in turn, guides the threaded end 19 into place. The pilot portion 28 has a hole 29, extending diametrically through it to receive a small rod or pin by means of which the stud may be held stationary, while the lower nut 27 is turned and before the key 23 becomes engaged in its keyway. The axis of hole 29 and the center line of key 23 have the same angular location relatively to the stud and lie one above the other in the same vertical plane. This arrangement may be utilized to facilitate entrance of a key 23 into its keyway. By turning the stud with a pin inserted in hole 29 until the axis of the pin is parallel with the vertical wall of a support 4 or 12, as the case may be, the workman will know when the key overlies its keyway.

In initially assembling the trays, the supports 4 and 12 are put in place and then the floor plates 3 are placed on their supports and fastened thereto by the described or any other suitable means, except for those marginal portions which rest on the ledge 14. This leaves a manway opening embordered by the ledge 14, which is provided with the holes 21 and keyways 22, these having been formed when the parts 4 and 12 were fabricated. The cover 13, with the washers 15 fixed thereto, is also prefabricated. The operator first applies the studs to the ledge 14. Each stud is inserted in its hole 21 and the key 23 is inserted in keyway 22. Then the washers 25 and 26 are slipped over the lower threaded portion 19 of each stud, followed by the lower nut 27, which is turned up, finger tight, so that the projection 24 engages the top of ledge 14. Thus, the studs will all be upstanding from the ledge. Then, the cover 13 is put in place, each stud passing through one of the washers 15 on the cover. The upper nuts 20 are then screwed on the upper ends of the studs and tightened up to clamp the cover to the ledge and also to press the marginal portions of the adjacent plates 3 against the ledge. The tightening of each nut 20 will also clamp the asbestos washer 25 against the lower face of ledge 14 to prevent leakage around hole 21 and its keyway 22. The tightening of each nut 20 will probably cause each stud to be drawn up slightly so that the projection 24 will be raised out of contact with the top of ledge 14, as shown in Fig. 2.

In removing the cover 13, one may unscrew the upper nuts 20, whereupon the cover may be lifted free of the studs, the latter remaining in their initial upstanding positions and each being prevented by its projection 24 from falling through its hole. Alternatively, the cover may be removed from below by unscrewing the lower nuts 27 and removing the washers 25 and 26, whereupon the cover may be pushed up, carrying with it all the studs. In replacing the cover, after having been removed from below, the pilots on the lower ends of the studs facilitate the entrance of the dangling studs into their holes. The lower nuts 27 are then applied. Each stud may then be held from turning, as by a pin inserted in hole 29, while the nut 27 is tightened and the stud may also be turned by this pin, if desired, to align the key 23 with its keyway 22.

Thus, the invention provides an improved fastening means for covers, which can be applied or removed from either side of the cover, the invention being especially suitable for use in holding in place the manway covers used in the trays of a bubble tower.

What is claimed is:

1. A manway cover clamp, comprising, a cover having a recess in its lower face and a cylindrical hole extending vertically through the cover into said recess, a horizontal support for the cover underlying said recess and hole and having a cylindrical hole extending vertically therethrough coaxial with the first-named hole and a keyway extending radially outward from the second-named hole and vertically through said support, a stud bolt extending through said holes and recess and having at one angular location thereon and located within said recess an outwardly extending projection with a shoulder thereon engaging the top of said support to prevent the stud bolt from falling through said holes and at another angular location and below said shoulder an outwardly projecting key engaged in said keyway to prevent the stud bolt from turning, and nuts on the upper and lower ends of the stud bolt respectively engaging the top of the cover and the bottom of the support.

2. A clamp, as claimed in claim 1, in which the axis of the keyway parallels an edge of the support and the stud bolt has a part extending below the lower nut and provided with a transverse hole therethrough, the axis of said transverse hole and the radial axis of the key being located in the same vertical plane, whereby the key may be aligned with its keyway by turning the stud bolt until the transverse hole parallels said edge.

References Cited in the file of this patent

UNITED STATES PATENTS

| Number | Name | Date |
|---|---|---|
| 694,691 | Stevens | Mar. 4, 1902 |
| 1,409,904 | Bayles | Mar. 21, 1922 |
| 2,476,009 | Wessman | July 12, 1949 |
| 2,525,217 | Glitsch | Oct. 10, 1950 |